(12) United States Patent
Hellstrom

(10) Patent No.: US 9,306,990 B2
(45) Date of Patent: Apr. 5, 2016

(54) SYSTEM AND METHOD FOR MAP COLLABORATION

(71) Applicant: Raytheon Company, Waltham, MA (US)

(72) Inventor: Charles Hellstrom, Fort Wayne, IN (US)

(73) Assignee: Raytheon Company, Waltham, MA (US)

(*) Notice: Subject to any disclaimer, the term of this patent is extended or adjusted under 35 U.S.C. 154(b) by 375 days.

(21) Appl. No.: 13/766,974

(22) Filed: Feb. 14, 2013

(65) Prior Publication Data

US 2014/0229861 A1 Aug. 14, 2014

(51) Int. Cl.
| | |
|---|---|
| *G06F 3/00* | (2006.01) |
| *H04L 29/06* | (2006.01) |
| *G01C 21/00* | (2006.01) |
| *G06F 3/01* | (2006.01) |
| *H04M 1/00* | (2006.01) |
| *G01C 21/20* | (2006.01) |
| *H04L 29/08* | (2006.01) |

(52) U.S. Cl.
CPC .............. *H04L 65/403* (2013.01); *G01C 21/00* (2013.01); *G01C 21/20* (2013.01); *G06F 3/01* (2013.01); *H04M 1/00* (2013.01); *H04L 67/14* (2013.01)

(58) Field of Classification Search
CPC ........................ G06F 3/0481; G07C 9/00111
USPC ......... 715/753; 340/539.13, 539.2; 455/456.1
See application file for complete search history.

(56) References Cited

U.S. PATENT DOCUMENTS

| | | | |
|---|---|---|---|
| 7,330,112 B1* | 2/2008 | Emigh et al. | ............. 340/539.13 |
| 2007/0288164 A1 | 12/2007 | Gordon et al. | |

(Continued)

FOREIGN PATENT DOCUMENTS

| | | |
|---|---|---|
| KR | 1020100135519 A | 12/2010 |
| WO | 2014/126903 A2 | 8/2014 |
| WO | WO-2014126903 A3 | 8/2014 |

OTHER PUBLICATIONS

"Google Maps", [online]. [archived Jan. 1, 2012]. Retrieved from the Internet: <URL: http://web.archive.org/web/20120101000927/http://maps.google.com/>, (2012), 1 pg.
"International Application Serial No. PCT/US2014/015756, International Search Report mailed Sep. 2, 2014", 3 pgs.
"International Application Serial No. PCT/US2014/015756, Written Opinion mailed Sep. 2, 2014", 4 pgs.

(Continued)

*Primary Examiner* — Haoshian Shih
(74) *Attorney, Agent, or Firm* — Schwegman Lundberg & Woessner, P.A.

(57) ABSTRACT

A system displays a map of a geographic area and an icon on a device associated with a first user. The icon represents a second user. The system further displays an indication on the device associated with the first user. The indication represents an area of the map displayed on a device associated with the second user. The system can further display a list of users on the device of the first user. The users on the list have devices associated with them and the devices associated with the users on the list display at least a portion of the map of the geographic area. The system receives input from the first user selecting a user from the list, and displays on the device associated with the first user the portion of the map of the geographic area that is displayed on the device associated with the user selected from the list.

19 Claims, 5 Drawing Sheets

(56) References Cited

U.S. PATENT DOCUMENTS

| | | |
|---|---|---|
| 2010/0115407 A1 | 5/2010 | Kim et al. |
| 2010/0259464 A1 | 10/2010 | Chang et al. |
| 2010/0262673 A1 | 10/2010 | Chang et al. |
| 2011/0238751 A1* | 9/2011 | Belimpasakis et al. ....... 709/204 |
| 2012/0166972 A1 | 6/2012 | Weber et al. |
| 2012/0177067 A1 | 7/2012 | Cho et al. |

OTHER PUBLICATIONS

Coenraets, Christophe, "Yahoo! Maps collaboration using Flex and BlazeDS", [online]. [archived on Dec. 2, 2012]. Retrieved from the Internet: <URL: http://web.archive.org/web/20121202171901/http://www.adobe.com/devnet/flex/articles/yahoomaps_collaboration.html>, (modified Apr. 28, 2008), 3 pgs.

* cited by examiner

SYSTEM AND METHOD FOR MAP COLLABORATION

GOVERNMENT RIGHTS

This invention was not made with United States Government support. The United States Government does not have certain rights in this invention.

TECHNICAL FIELD

The present disclosure relates to a system and method for map collaboration.

BACKGROUND

In many kinds of planning situations, multiple users need to remotely collaborate on a shared map. If the shared map is large enough, each user may have no idea what portions of the map the other users are currently viewing. The users may also have no way to quickly move to the locations other users are viewing. Current map collaboration systems display only the current location of each user, and permit only a single (i.e., either a two dimensional or a three dimensional) map environment.

DETAILED DESCRIPTION

The following description and drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In an embodiment of a map collaboration system, each user is provided with a customizable icon. The icon for each user is placed on the map at the location that he or she is currently viewing (or that is being displayed on a device that is associated with that user). In three dimensional map environments, the icon is also placed at the altitude of the user. This allows every user to be aware of what segments of the map that other users have displayed on their devices. A user can click on an icon, and jump to the portion of the map that is displayed on the device associated with the selected user icon. A user can also click on a user in a list of users and immediately jump to the portion of the map that is currently displayed on the selected user's device.

Figure 2:
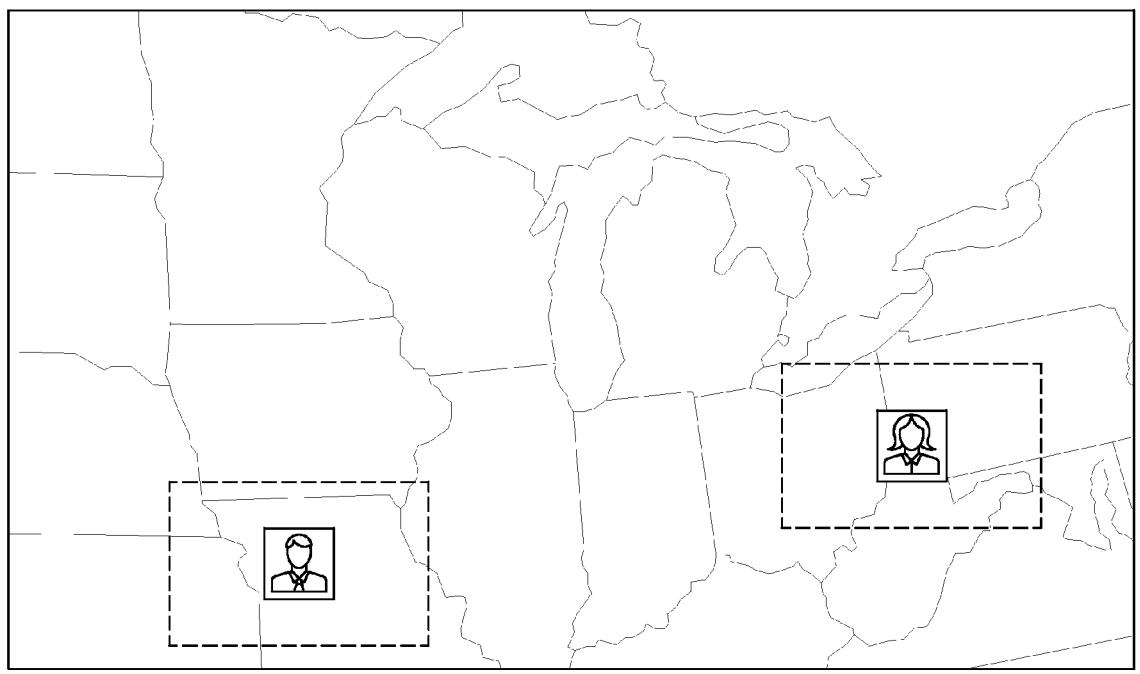
FIG. 2 is an example display of a map collaboration system.
Figure 3:
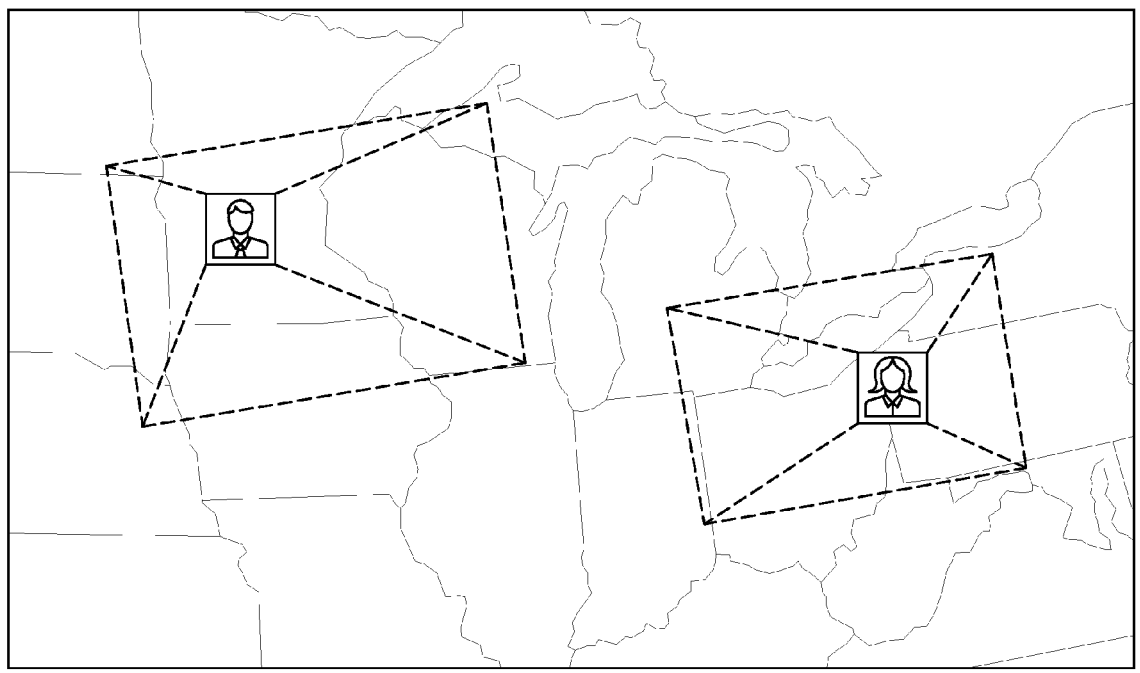
FIG. 3 is another example display of a map collaboration system.

An embodiment can also display on the map a graphic that represents the portion of the map that is displayed to each user. As illustrated in FIG. 2, in two dimensional map environments, the graphic can be a polygon surrounding each user icon. As illustrated in FIG. 3, in three dimensional map environments, the graphic can be a pyramid that intersects with the earth, and that represents the volume of space that is displayed on the device of a user. These visualizations allow users to easily determine the areas of the world that are in each user's view range.

Additionally, an embodiment displays the real-time location of all users and also highlights the portion of the map that is currently displayed on a device associated with each user. An embodiment further allows some users to use two dimensional maps and at the same time or during the same session others to use three dimensional maps, with the two dimensional and three dimensional visualizations functioning in one or more map environments.

Consequently, one or more embodiments address the following issues with current map collaboration systems. First, an embodiment permits remotely located users to collaborate on a shared map in real time. Second, on large maps, an embodiment permits users to be aware of what portion of the map other users are viewing (or at least the portion of the map that is displayed on another user's device). Third, an embodiment permits a user to quickly jump to other users' locations. While prior map systems have attempted to provide these capabilities, such as by syncing the position of a map between two or more users, and/or collaboratively editing the map, such prior systems provide no visual representation of where all active users are located.

In an embodiment, each user has a customizable icon, and the icon for each user is placed at the location that is displayed on a device associated with that particular user. Users can click on the user name of other users to jump to the location of the other users (that is, display what is displayed to the other users). Such a display includes a visual representation of the area each user can see, and the area is displayed around each user's icon. As noted, users can instantly jump to the location of other users, can see the real-time location of other users, and can see what areas of the map are being displayed to other users. As noted, an embodiment can handle the differences between different types of maps during a collaboration session, that is, between two dimensional and three dimensional maps.

Figure 4:
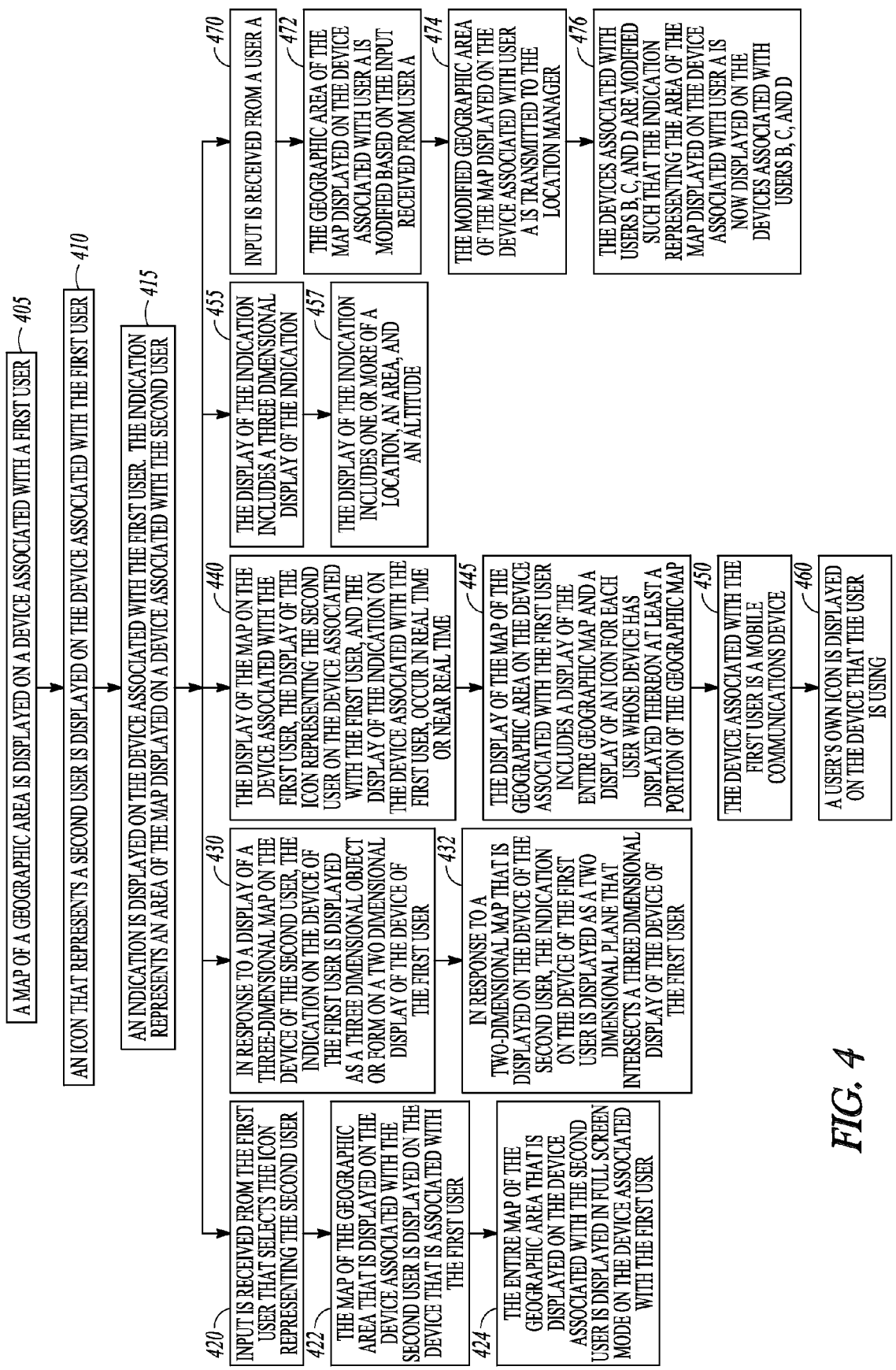
FIG. 4 is a block diagram illustrating steps and features of a map collaboration process and system.
Figure 5:
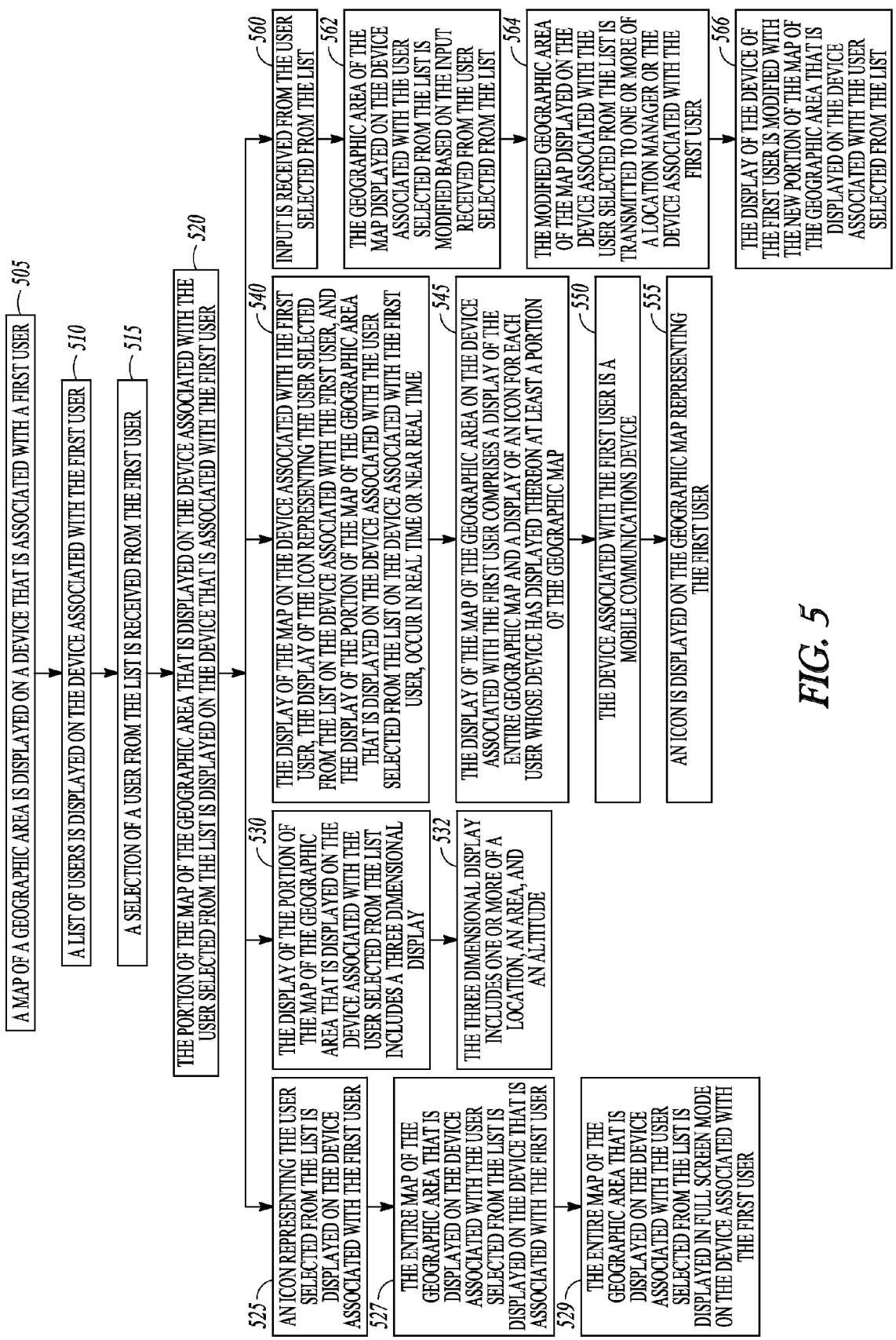
FIG. 5 is a block diagram illustrating steps and features of another map collaboration process and system.

FIGS. 4 and 5 are block diagrams illustrating steps and features of two example embodiments of map collaboration processes and systems. FIGS. 4 and 5 include a number of process blocks 405-476 and 505-566 respectively. Though arranged serially in the examples of FIGS. 4 and 5, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

At 405, a map of a geographic area is displayed on a device associated with a first user, and at 410, an icon is displayed on the device associated with the first user. The icon represents a second user. At 415, an indication is displayed on the device associated with the first user. The indication represents an area of the map displayed on a device associated with the second user.

At 420, input is received from the first user that selects the icon representing the second user. At 422, the map of the geographic area that is displayed on the device associated with the second user is displayed on the device that is associated with the first user. At 424, the entire map of the geographic area that is displayed on the device associated with the second user is displayed in full screen mode on the device associated with the first user. That is, the geographic area that is displayed on the device associated with the second user can be displayed on the device associated with the first user as either a thumbnail, as the entire display, or some intermediate sized display.

In an embodiment, the display of the indication on the device associated with the first user that represents the area of the map displayed on the device associated with the second user addresses situations wherein the first user and second user have different display capabilities. For example, at 430, in response to a display of a three-dimensional map on the device of the second user, the indication on the device of the first user is displayed as a three dimensional object or form on a two dimensional display of the device of the first user. As another example, at 432, in response to a two-dimensional map that is displayed on the device of the second user, the indication on the device of the first user is displayed as a two dimensional plane that intersects a three dimensional display of the device of the first user. In another embodiment, two dimensional maps can be displayed with different projections. That is, an embodiment can translate a view visualization from one two dimensional projection to another two dimensional projection.

At 440, the display of the map on the device associated with the first user, the display of the icon representing the second user on the device associated with the first user, and the display of the indication on the device associated with the first user, occur in real time or near real time. At 445, the display of the map of the geographic area on the device associated with the first user includes a display of the entire geographic map and a display of an icon for each user whose device has displayed thereon at least a portion of the geographic map. This feature provides a landscape of the location of all the users who are using the map collaboration system. At 450, it is noted that the device associated with the first user is a mobile communications device. The devices associated with the other users can also be mobile communication devices. Also, one or more users can use a lap top computer or other less mobile device, especially in instances wherein the user has managerial, operator, or commander types of responsibilities.

At 455, the display of the indication includes a three dimensional display of the indication. At 457, the display of the indication includes one or more of a location, an area, and an altitude.

At 460, a user's own icon is displayed on the device that the user is using. In embodiments in which the user is displaying the icons of other users, the display of the user's own icon provides information to the user about the relative location of other users.

Figure 1:
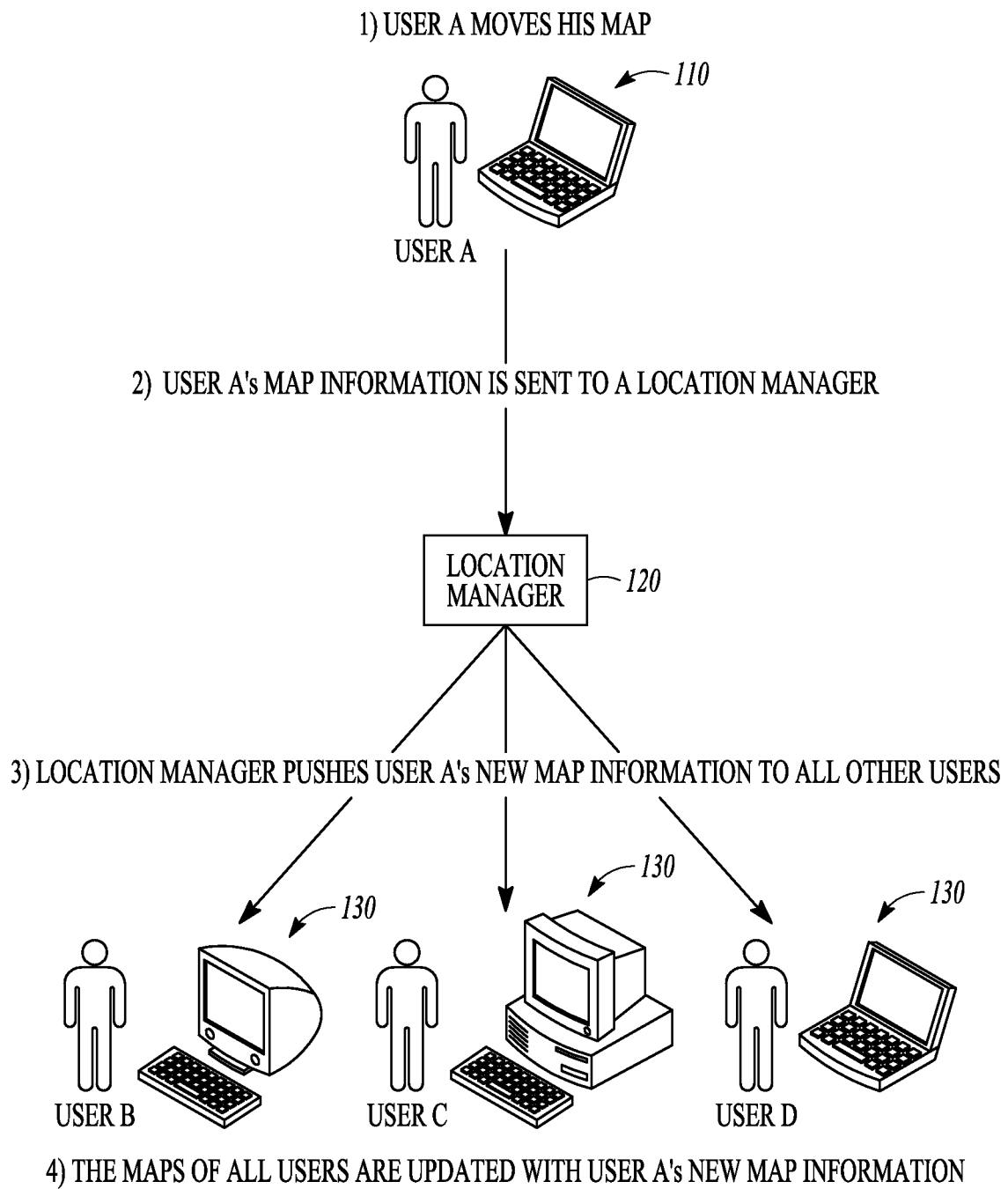
FIG. 1 illustrates an embodiment of a map collaboration system.

An embodiment that uses a location manager server is illustrated in FIG. 1. Referring to FIGS. 1 and 4, at 110 and 470, input is received from a user A. At 472, the geographic area of the map displayed on the device associated with user A is modified based on the input received from user A. At 120 and 474, the modified geographic area of the map displayed on the device associated with user A is transmitted to the location manager. Then, at 476, the devices 130 associated with users B, C, and D are modified such that the indication representing the area of the map displayed on the device associated with user A is now displayed in part or in whole on the devices 130 associated with users B, C, and D.

FIG. 5 illustrates another embodiment of a map collaboration process and system. At 505, a map of a geographic area is displayed on a device that is associated with a first user. At 510, a list of users is displayed on the device associated with the first user. The users on the list have communication devices that are associated with them. The communication devices associated with the users on the list are configured to display at least a portion of the map of the geographic area. At 515, input is received from the first user. The input received from the first user includes a selection of a user from the list. At 520, the portion of the map of the geographic area that is displayed on the device associated with the user selected from the list is displayed on the device that is associated with the first user.

At 525, an icon representing the user selected from the list is displayed on the device associated with the first user. At 527, the entire map of the geographic area that is displayed on the device associated with the user selected from the list is displayed on the device that is associated with the first user. That is, with this feature, the entire map of the geographic area can be displayed on only a portion of the display of the device that is associated with the first user (e.g., as a thumbnail). At 529, the entire map of the geographic area that is displayed on the device associated with the user selected from the list is displayed in full screen mode on the device associated with the first user. That is, with this feature, the entire map of the geographic area is displayed on the entire area of the display of the device that is associated with the first user.

At 530, the display of the portion of the map of the geographic area that is displayed on the device associated with the user selected from the list includes a three dimensional display. At 532, the three dimensional display includes one or more of a location, an area, and an altitude.

At 540, the display of the map on the device associated with the first user, the display of the icon representing the user selected from the list on the device associated with the first user, and the display of the portion of the map of the geographic area that is displayed on the device associated with the user selected from the list on the device associated with the first user, occur in real time or near real time. At 545, the display of the map of the geographic area on the device associated with the first user comprises a display of the entire geographic map and a display of an icon for each user whose device has displayed thereon at least a portion of the geographic map. As noted above in connection with FIG. 4, this feature permits a user to observe his or her location relative to the locations of others. At 550, it is noted that the device associated with the first user is a mobile communications device. At 555, an icon is displayed on the geographic map representing the first user. This feature, just like the previously discussed feature, permits a user to examine his or her location as it pertains to others.

At 560, input is received from the user selected from the list. At 562, the geographic area of the map displayed on the device associated with the user selected from the list is modified based on the input received from the user selected from the list (FIG. 1, No. 110). At 564, the modified geographic area of the map displayed on the device associated with the user selected from the list is transmitted to one or more of a location manager (FIG. 1, No. 120) or the device associated with the first user. At 566, the display of the device of the first user is modified with the new portion of the map of the geographic area that is displayed on the device associated with the user selected from the list (FIG. 1, No. 130).

Figure 6:
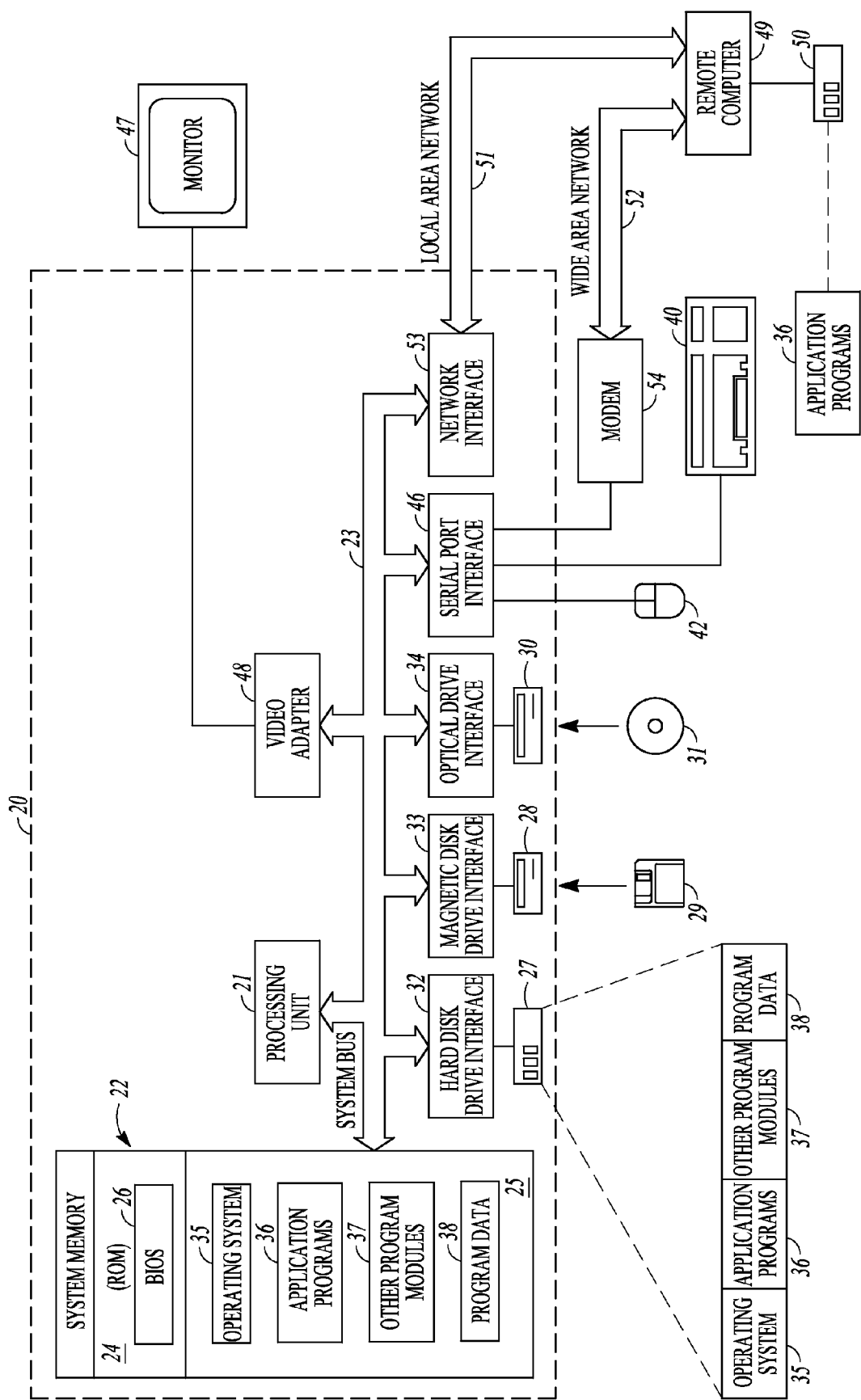
FIG. 6 is a block diagram of a computer system upon which one or more embodiments of the present disclosure can execute.

FIG. 6 is an overview diagram of hardware and an operating environment in conjunction with which embodiments of the invention may be practiced. The description of FIG. 6 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 6, a hardware and operating environment is provided that is applicable to any of the servers and/or remote clients shown in the other FIGS.

As shown in FIG. 6, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 6 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
a computer processor and computer storage device operable to:
display a map of a geographic area on a device associated with a first user;
display an icon on the device associated with the first user, the icon representing a second user; and
display an indication on the device associated with the first user, the indication representing an area of the map displayed on a device associated with the second user;
wherein the display of the indication on the device associated with the first user that represents an area of the map displayed on the device associated with the second user comprises:
in response to a display of a three-dimensional map on the device of the second user, displaying the indication on the device of the first user as a three dimensional object or form on a two dimensional display of the device of the first user; and
in response to a two-dimensional map that is displayed on the device of the second user, displaying the indication on the device of the first user as a two dimensional plane that intersects a three dimensional display of the device of the first user.

2. The system of claim 1, wherein the computer processor is operable to:
receive an input from the first user selecting the icon representing the second user; and
display on the device associated with the first user the map of the geographic area that is displayed on the device associated with the second user.

3. The system of claim 2, wherein the computer processor is operable to display on the device associated with the first user in full screen mode the map of the geographic area that is displayed on the device associated with the second user.

4. The system of claim 1, wherein the display of the indication comprises a three dimensional display of the indication.

5. The system of claim 4, wherein the display of the indication comprises one or more of a location, an area, and an altitude.

6. The system of claim 1, wherein the display of the map on the device associated with the first user, the display of the icon representing the second user on the device associated with the first user, and the display of the indication on the device associated with the first user, occur in real time or near real time.

7. The system of claim 1, wherein the display of the map of the geographic area on the device associated with the first user comprises a display of the geographic map and a display of an icon for each user whose device has displayed thereon at least a portion of the geographic map.

8. The system of claim 1, wherein the device associated with the first user comprises a mobile communications device.

9. The system of claim 1, wherein the computer processor is operable to display an icon on the geographic map representing the first user.

10. The system of claim 1, wherein the computer processor is operable to:
receive input from the second user;
modify the geographic area of the map displayed on the device associated with the second user based on the input received from the second user;
transmit the modified geographic area of the map displayed on the device associated with the second user to the device associated with the first user; and
modify, on the device associated with the first user, the indication representing the area of the map displayed on the device associated with the second user.

11. A system comprising:
a computer processor and computer storage device operable to:
display a first portion of a map of a geographic area on a device associated with a first user;
display a list of users, the users on the list having devices associated with the users, the devices associated with the users on the list displaying one or more second portions of the map of the geographic area, wherein the one or more second portions are different than the first portion;
receive an input from the first user selecting a user from the list; and
display on the device associated with the first user the one or more second portions of the map of the geographic area that is displayed on the device associated with the user selected from the list.

12. The system of claim 11, wherein the computer processor is operable to:
display on the device associated with the first user an icon representing the user selected from the list; and
display on the device associated with the first user the one or more second portions of the map of the geographic area that is displayed on the device associated with the user selected from the list.

13. The system of claim 12, wherein the computer processor is operable to display on the device associated with the first user in full screen mode the one or more second portions of the map of the geographic area that is displayed on the device associated with the user selected from the list.

14. The system of claim 11, wherein the display of the one or more second portions of the map of the geographic area that is displayed on the device associated with the user selected from the list comprises a three dimensional display of an indication; and wherein the display of the indication comprises one or more of a location, an area, and an altitude.

15. The system of claim 11, wherein the display of the first portion of the map on the device associated with the first user, the display of the icon representing the user selected from the list on the device associated with the first user, and the display of the one or more portions of the map of the geographic area that is displayed on the device associated with the user selected from the list on the device associated with the first user, occur in real time or near real time.

16. The system of claim 11, wherein the display of the first portion of the map of the geographic area on the device associated with the first user comprises a display of the geographic map and a display of an icon for each user whose device has displayed thereon the one or more second portions of the geographic map.

17. The system of claim 11, wherein the device associated with the first user comprises a mobile communications device.

18. The system of claim 11, wherein the display of the more or more second portions of the map of the geographic area on the device associated with the first user comprises:
- in response to a display of a three-dimensional map on the device of the second user, displaying on the device of the first user a three dimensional object or form on a two dimensional display of the device of the first user; and
- in response to a two-dimensional map that is displayed on the device of the second user, displaying on the device of the first user a two dimensional plane that intersects a three dimensional display of the device of the first user.

19. The system of claim 11, wherein the computer processor is operable to:
- receive input from the user selected from the list;
- modify the one or more second portions of the geographic area of the map displayed on the device associated with the user selected from the list based on the input received from the user selected from the list;
- transmit the modified one or more second portions of the geographic area of the map displayed on the device associated with the user selected from the list to the device associated with the first user; and
- modify, on the device associated with the first user, the one or more second portions of the map of the geographic area that is displayed on the device associated with the user selected from the list.

* * * * *